V. CAMAL.
FLYING MACHINE.
APPLICATION FILED MAR. 17, 1910.

996,613.

Patented July 4, 1911.

4 SHEETS—SHEET 1.

Witnesses:
F. Kasper.
J. E. Hehlen.

Inventor:
Victor Camal
by B. Singer.
assy.

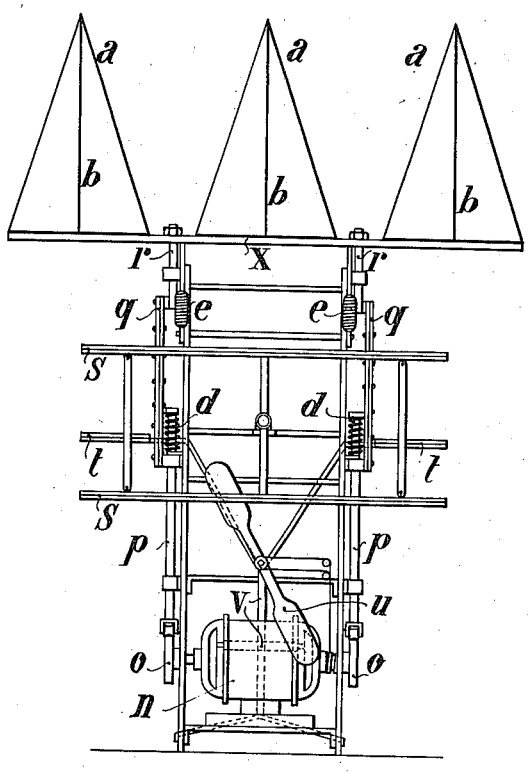
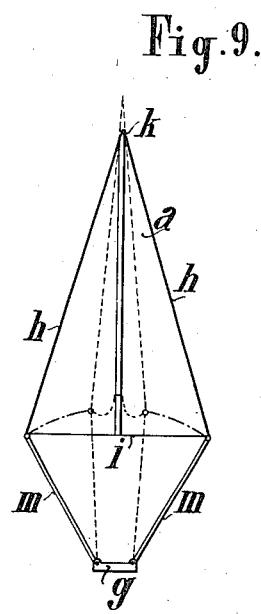
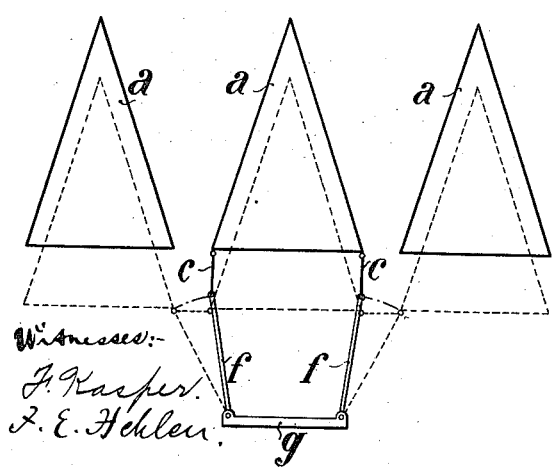
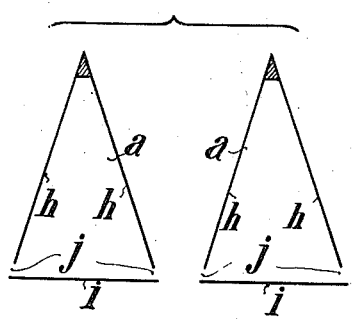

V. CAMAL.
FLYING MACHINE.
APPLICATION FILED MAR. 17, 1910.
996,613.
Patented July 4, 1911.
4 SHEETS—SHEET 3.
Fig. 10.
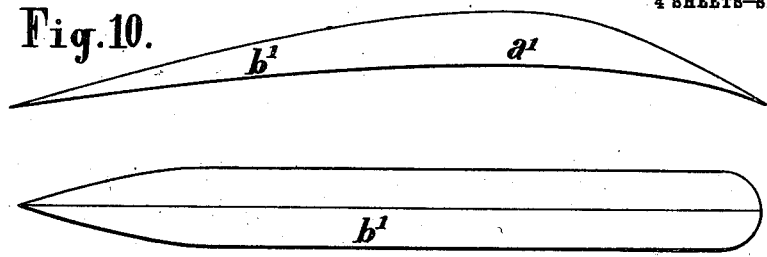
Fig. 11.
Fig. 14.
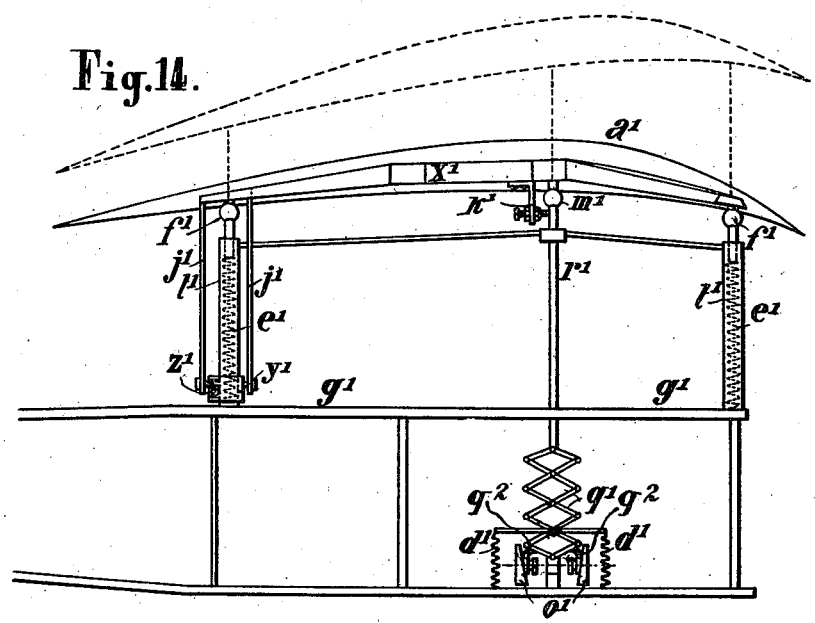
Fig. 15.
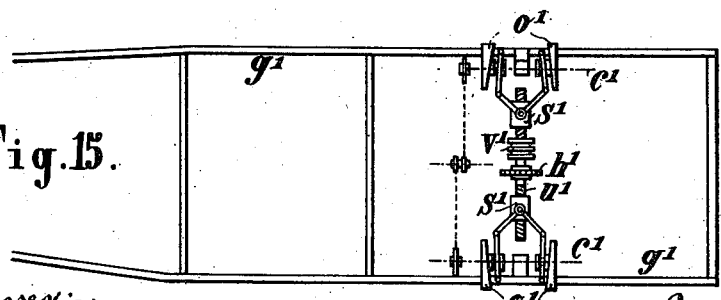
Witnesses:—
F. Kasper.
J. E. Hehlen.
Inventor:—
Victor Camal
by B. Singer.
Atty.

V. CAMAL.
FLYING MACHINE.
APPLICATION FILED MAR. 17, 1910.
996,613.
Patented July 4, 1911.
4 SHEETS—SHEET 4.
Fig.12.
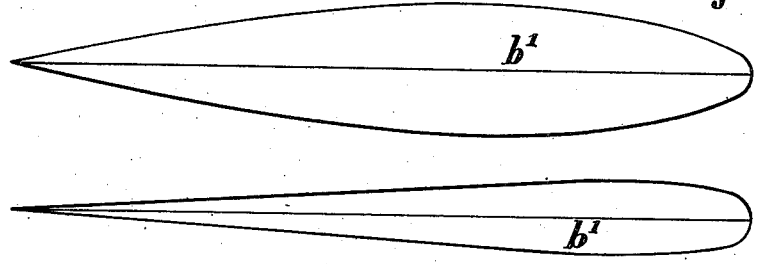
Fig.13.
Fig.16.
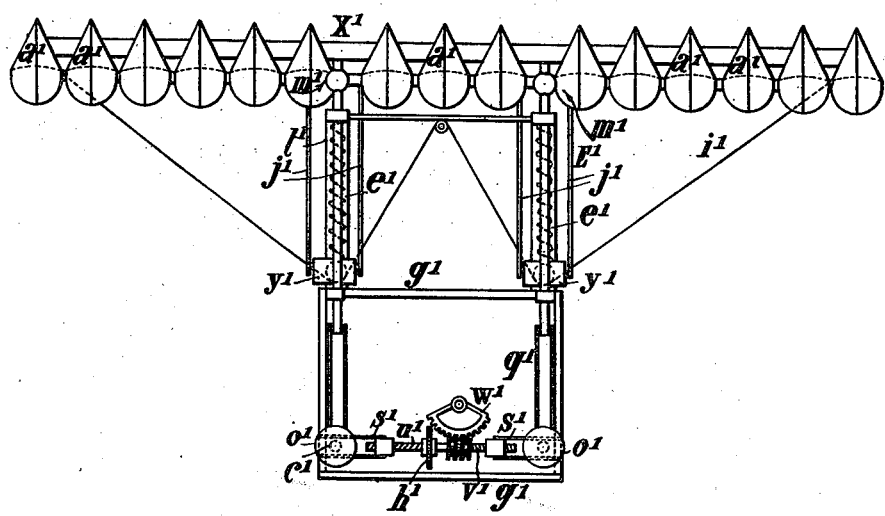
Witnesses:
H. Kasper.
J. E. Fehlen.
Inventor:-
Victor Camal
by B. Singer
atty.

UNITED STATES PATENT OFFICE.

VICTOR CAMAL, OF PARIS, FRANCE.

FLYING-MACHINE.

996,613.  Specification of Letters Patent.  Patented July 4, 1911.

Application filed March 17, 1910. Serial No. 550,041.

*To all whom it may concern:*

Be it known that I, VICTOR CAMAL, a citizen of the Republic of France, residing at 23 Quai de Grenelle, Paris, France, have invented new and useful Improvements in Flying-Machines, of which the following is a specification.

This invention has for its object a flying machine characterized by a mechanical device enabling it to rise vertically and directly independently of the movement of translation. This elevation is obtained by a special set of sails to which a reciprocating movement in the vertical direction is imparted.

The description which follows with reference to the accompanying drawings will render the features of this flying machine readily intelligible.

Figure 2:
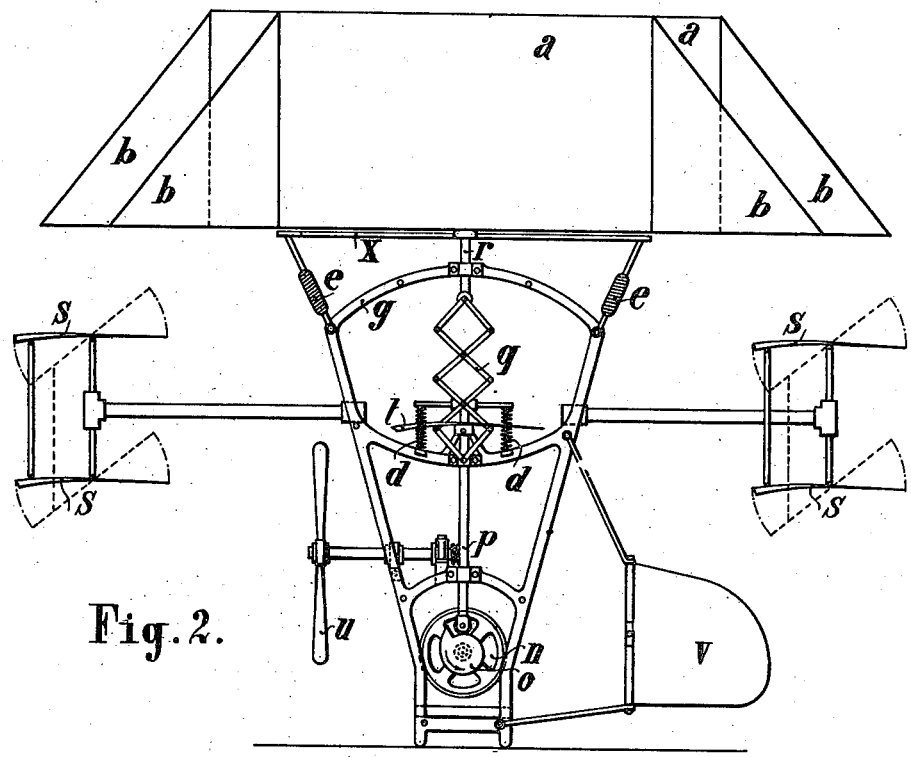
Figure 4:
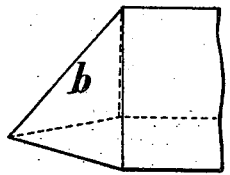
Figure 1:
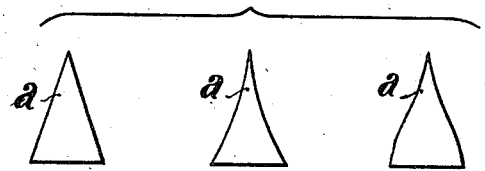
Figure 5:
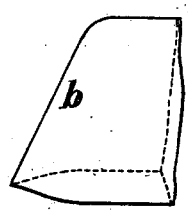
Figure 6:
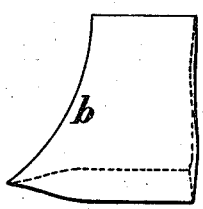

Figure 1 represents various forms of sails in sections. Figs. 2 and 3 represent by way of example in side elevation and front elevation respectively a flying machine embodying this invention. Figs. 4, 5 and 6 represent various forms of a prow. Fig. 7 shows a modified form of the supporting elements in front elevation provided with shutters. Fig. 8 represents another form of element presenting orifices at the lower part. Fig. 9 illustrates elements formed by movable panels pivoted at the apex. Figs. 10, 11, 12 and 13 illustrate various other forms of elements of the supporting plane. Fig. 14 shows in side elevation the means for obtaining an undulatory movement. Fig. 15 represents in plan the means employed for obtaining the differential movement facilitating turning. Fig. 16 shows in front elevation the means for obtaining these various movements.

The sails present a triangular section with a very acute upper angle ($a$) so as to reduce as far as possible the resistance of the air in the upward movement; they can be given one or other of the forms indicated in Fig. 1 and comprise one or more elements. These elements are constituted by hollow prisms ($a$) isosceles in section provided at their extremities with prows adapted to penetrate the air with the minimum of resistance and which may present the forms represented in Figs. 4, 5 and 6, their edges ($b$) being very sharp. The elements $a$ may vary in length, it being preferred that the central element, as shown in Fig. 2, be somewhat longer than the outer elements. These elements may be provided laterally with shutters ($c$), Fig. 7, arranged in such a manner that they close, thus increasing the surface reacting upon the air during the descent of the elements ($a$) under the antagonistic action of the springs ($d$) and ($e$), while they open completely during the upward movement of the said elements, under the influence of the levers ($f$) fixed at one of their ends to a fixed point of the framework ($g$). These elements instead of being complete solids as in Fig. 4 may be established as represented in Fig. 8 in such a manner that the sides ($h$) are not connected directly with the base ($i$) and that between their lower extremity and the sides of the base ($i$) an interval ($j$) is left permitting the air which might be compressed between the planes ($h$) to flow off readily. These elements may likewise be formed as indicated in Fig. 9, that is to say that the sides ($h$) are formed of panels movable around the apex ($k$) so that they and the base ($i$) can be extended under the influence of the jointed levers ($m$) during the downward movement of the latter by the antagonistic effort of the springs ($d$) and ($e$). These levers ($m$) may be simple or extensible or jointed in such a manner as to obtain the maximum effect for a minimum effort. The walls of the elements may be made either of any suitable fabric or of panels of wood, of solid or perforated metal or of a trellis. In the movement of descent the bases ($i$) of these sails prevent the air beneath from flowing out and this with an appropriate velocity and surface produces a pressure acting in the vertical direction which lifts the machine as a whole. During this upward movement the sails have effected their movement of ascent and on the descent again act by their base upon the air so as to produce a fresh elevation of the whole. This movement is transmitted to the sails from the motor either by cranks or by eccentrics or by cams with counter springs or dash pots. It is this latter arrangement that is represented in Figs. 2 and 3 where the electric motor ($n$) controls two cams ($o$) arranged on either side of the motor and which force back rods ($p$) which rods operate transmissions with multiple lazy-tongs ($q$) amplifying the movement of the rods ($p$) and communicating this amplified movement by means of the rods ($r$) to the elements ($a$) mounted on a frame ($x$) common to them all. The movement of descent of the elements ($a$) is produced by the springs ($e$) and ($d$) in such a manner that a very rapid and very sudden movement of descent is produced. The base or bases of the sails are likewise utilized for support in the movement of translation; by its special form it provides for absolute safety; in case the motor should stop or an accident of any kind occur it forms a parachute.

The surface of the sails, the amplitude and speed of their movement are calculated in such a manner that the pressure of the air upon the base is greater than the pressure acting in the opposite direction and resulting from the weight of the machine.

The machine is rendered stable by lowering the center of gravity and is insured during the movement of translation, like the support of the machine, by planes ($s$) arranged at the front and at the rear of the machine as shown in Figs. 2 and 3. These planes may be single or multiple and are constructed in such a manner as to present the minimum resistance to progress; according to circumstances they may be formed of a single surface or of lamellæ which are imbricated by the pressure of the air. These planes or groups of planes are movable in the vertical direction and in front, to the rear, to the left or to the right in order to facilitate the movements of ascent and descent and likewise turning. In certain cases similar planes might be arranged laterally as shown at ($t$), Figs. 2 and 3.

The movement of translation is obtained by means of one or more screws arranged either at the front or at the rear of the machine or laterally, or by means of one or more groups of concentric screws driven by the motor; in Figs. 2 and 3 a single screw ($u$) is arranged in front. These screws may be either of fixed or of variable pitch; their shaft is capable of displacement in a vertical plane in accordance with the relative velocity of the system in such a manner as to cause the center of traction or of propulsion to coincide with the center of mass.

The steering in a vertical plane is obtained by operating the front and rear or lateral planes previously referred to; steering in a horizontal plane is provided for by a rudder ($v$) with vertical shaft (Fig. 2) arranged at the rear and by the lateral wings; this rudder may either be simple or cellular.

This invention likewise comprises various constructional modifications of the constituent elements of the supporting plane and means for imparting to the supporting plane an undulatory movement of variable amplitude and direction, for the purpose of transforming the resistance of the air into ascensional force and into propulsive force and of facilitating turning independently or concurrently with the steering rudder.

The constituent elements ($a'$) of the supporting plane may present a rectilinear or a concave base as shown in Fig. 10. This base may either be an arc of a circle or an elliptical, parabolic or any other appropriate curve. The surface of this base ($b'$) may present various forms as shown by way of example in Figs. 11, 12 and 13. The reciprocating movement given to the supporting plane may be rectilinear or undulatory.

The supporting plane constituted by the elements ($a'$) Fig. 14 mounted upon a frame ($x'$) is given a vertical reciprocating movement by the double cams ($o'$) situated on either side of the framework ($g'$) of the machine engaging lugs $q^2$ of the intermediate multiplying parallelograms ($q'$) which transmit their amplified movement to the rods ($r'$). These rods ($r'$) are connected with the frame ($x'$) by means of ball joints ($m'$) enabling the plane to oscillate in all directions. These ball joints ($m'$) are provided at the rear with an adjustable stop ($k'$) for limiting the rearward inclination of the plane and furnishing it with a suitable limit incidence. This same frame ($x'$), is likewise connected to the framework ($g'$) of the machine by springs ($e'$) ($e'$) of given different powers, the upper ends of which are fixed to other ball joints ($f'$) integral with the frame ($x'$).

The springs ($e'$) ($e'$) are arranged in vertical tubes ($t'$) fixed to the framework ($g'$) of the machine; upon these tubes ($t'$) boxes ($y'$) slide; they are connected with the frame ($x'$) by rigid jointed rods ($j'$). These boxes ($y'$) contain a packing ($z'$) of plastic material which acts as a brake upon the outer wall of the tubes ($t'$) by the action of regulating springs or screws or any other convenient means for the purpose of retarding the displacement of the rear of the plane relatively to the reciprocating movement of the rods ($r'$). The pressure exerted by these packings ($z'$) upon the tubes ($t'$) is adjustable by compressing in the boxes ($y'$).

In the upward movement the rear of the plane is retarded by the braking of the boxes ($y'$); the front experiences only the traction of the spring ($e'$) to which the rear is likewise subjected. The supporting plane then assumes a certain incidence as represented in broken lines in Fig. 14 this incidence attaining its maximum at the moment at which the stops ($k'$) of the ball joints ($m'$) contact with and bear upon the rods ($r'$). At this moment, the plane continues its upward movement in preserving the same incidence and the boxes ($y'$) are likewise raised through a certain height.

When owing to their rotation the cams ($o'$) have ceased to act upon the parallelograms ($q'$) the movement of descent of the plane is produced by the sudden counter action of the springs (*e'*) and (*d'*). The front of the plane is rapidly drawn back while its rear is drawn back more slowly owing to the braking produced by the packings (*z'*) in the boxes (*y'*). At the beginning of this movement of descent the supporting plane consequently assumes a negative incidence relatively to its incidence in the upward movement. By reason of this sudden and rapid drawing back the action of the air upon the base of the elements (*a'*) of the supporting plane is very great and is decomposable into an ascensional force and a propulsive force in the direction of the travel of the machine. This resistance likewise has the effect of retarding the depression of the front of the plane in such a manner that notwithstanding the braking the rear of the planes assumes a more accentuated movement of descent under the action of the springs (*e'*) thereby reestablishing a positive incidence of the plane. The action of the cams (*o'*) upon the parallelograms (*q'*) recurs for another identical period.

The double cams (*o'*) are displaceable along their driving shaft (*c'*) and their position can be varied as regards the interval separating them by means of jointed levers connected with sleeves (*s'*) displaceable along a screw threaded shaft (*u'*), Figs. 15 and 16. This shaft comprises a right hand thread and a left hand thread so that when rotated by the driving wheel (*h'*) the cams (*o'*) approach or separate from each other equally on each side of the framework (*g'*) of the machine and consequently impart a greater or less amplitude to the upward movement of the supporting plane; in this movement the plane moves parallel with its generating line. Upon this screw threaded shaft (*u'*) there is fixed a circular rack (*v'*) meshing with a toothed sector (*w'*) controlled by the aviator. Owing to this arrangement the aviator is able to displace the shaft (*u'*) laterally along its axis at will, in such a manner that on one side the cams (*o'*) exert little or no action upon the corresponding parallelogram while those on the opposite side operate for a greater amplitude. Owing to this difference of lateral movement the supporting plane is displaced obliquely to itself and the apparatus tends to turn to the side on which the cams exert the least action, while nevertheless insuring the support, the speed of travel and stability.

The control for the levers modifying the position of the cams relatively to those located on the other side of the framework (*g'*) may be connected with the control for the steering rudder or be completely independent. The guys (*i'*) of the plane are displaceable by sliding on rollers in such a manner that rigidity is insured.

Having now particularly described and ascertained the nature of my invention and in what manner the same is to be performed, I declare that what I claim is:

1. In a flying machine of the character described, a frame, a motor within said frame, two cams arranged at opposite ends of said motor, cam engaging means, lazy-tongs operated by said means, framework connected to the upper ends of said lazy-tongs, a plurality of sailing elements carried by said framework, means to impart to said sailing elements, an undulatory movement of variable amplitude and direction, means to increase the surface of said elements during the descent and to decrease the surface of said elements during the ascent of the machine and means for steering, balancing and propelling the machine.

2. In a flying machine of the character described, a frame, a motor within said frame, two cams arranged at opposite ends of said motor, cam engaging means, lazy-tongs operated by said means, framework connected to the upper ends of said lazy-tongs, a plurality of isocellular sailing elements of triangular cross-section provided with shutters and adapted to act as a parachute in case of accident, carried by said framework, springs tending to effect a closing of the cells during the descent and a lever connected to the frame, adapted to open said cells during the ascent and means for steering, balancing and propelling the machine.

3. In a flying machine of the character described, a frame, a motor within said frame, two cams arranged at opposite ends of said motor, cam engaging means, lazy-tongs operated by said means, framework connected to the upper ends of said lazy-tongs, a plurality of isocellular sailing elements of triangular cross-section composed of a plurality of panels, having their bases in spaced relation to the lower extreme ends of their sides, prows at their extremities adapted to penetrate the air with the minimum of resistance, jointed levers adapted to extend said elements during the downward movement of the machine, means to close said cells during the ascent, planes movable in vertical and horizontal direction adapted to balance and steer the machine in a vertical plane, screws actuated by the motor to drive the machine, and a rudder for steering the machine in a horizontal plane.

4. In a flying machine of the character described, a frame, a motor within said frame, two cams arranged at opposite ends of said motor, cam engaging means, lazy-tongs operated by said means, framework connected to the upper ends of said lazy-tongs, a plurality of isocellular sailing elements of triangular cross-section composed of a plurality of panels having their bases in spaced relation to the lower extreme ends of their sides, prows at their extremities adapted to penetrate the air with the minimum of resistance, jointed levers adapted to extend said elements during the downward movement of the machine, means to close said cells during the ascent, planes movable in vertical and horizontal direction adapted to balance and steer the machine in a vertical plane, screws actuated by the motor to drive the machine, a rudder for steering the machine in a horizontal plane, and means for imparting to the sailing elements an undulatory movement of variable amplitude and direction for the purpose of transferring the resistance of the air into ascensional force and into propulsive force and of facilitating turning independently or concurrently with the steering rudder.

5. In a flying machine of the character described, a frame, a motor within said frame, sails constituted of a plurality of elements mounted upon a supporting plane, double cams at either side of the frame of the machine, multiplying parallelograms, rods connecting said parallelograms and the supporting plane, ball joints at the point of such connections enabling the plane to oscillate in all directions, and adjustable stops for limiting the rearward inclination of the plane.

6. In a flying machine of the character described, a frame, a motor within said frame, sails constituted of a plurality of elements having a concave base mounted as a supporting plane, springs connecting the supporting plane to the frame of the machine, tubes in which said springs are incased, ball joints at the points of connection, boxes sliding upon said tubes, rods connecting said boxes to the supporting plane and braking means to retard the displacement of the rear of the plane.

7. In a flying machine of the character described, a frame, a motor within said frame, sails constituted of a plurality of elements having a concave base mounted as a supporting plane, springs connecting the supporting plane to the frame of the machine, tubes in which said springs are incased, ball joints at the points of connection, boxes sliding upon said tubes, rods connecting said boxes to the supporting plane and a packing of plastic material frictionally engaging the outer wall of said tubes for the purpose of retarding the displacement of the rear of the plane relatively to the reciprocating movement of said rods.

8. In a flying machine of the character described, a frame, a motor within said frame, sails constituted of a plurality of elements mounted as a supporting plane, double cams at either side of the plane of the machine, a driving shaft displaceably carrying said cams, a shaft provided with right- and left-hand thread, sleeves displaceable upon said shaft, and means to increase or decrease the distance separating said cams for the purpose of imparting a greater or less amplitude to the upward movement of the supporting plane.

9. In a flying machine of the character described, a frame, a motor within said frame, sails constituted of a plurality of elements mounted as a supporting plane, double cams at either side of the plane of the machine, a driving shaft displaceably carrying said cams, a shaft provided with right- and left-hand thread, a circular rack upon said shaft, a toothed sector controlled by the aviator engaging the teeth of said circular rack for the purpose of turning the apparatus.

In testimony whereof I affix my signature.

VICTOR CAMAL.

In the presence of—
  Victor Prévost,
  H. C. Coxe.